United States Patent
Park et al.

(10) Patent No.: US 11,409,879 B2
(45) Date of Patent: Aug. 9, 2022

(54) ELECTRONIC DEVICE FOR UPDATING FIRMWARE BASED ON USER AUTHENTICATION AND AN OPERATING METHOD THEREOF

(71) Applicant: SAMSUNG ELECTRONICS CO., LTD., Suwon-si (KR)

(72) Inventors: Keunyoung Park, Seongnam-si (KR); Dongjin Park, Seoul (KR); Jungtae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 17/029,442

(22) Filed: Sep. 23, 2020

(65) Prior Publication Data

US 2021/0216638 A1    Jul. 15, 2021

(30) Foreign Application Priority Data

Jan. 14, 2020    (KR) .................... 10-2020-0004950

(51) Int. Cl.
*G06F 21/57*        (2013.01)
*G06F 21/31*        (2013.01)
*G06F 21/74*        (2013.01)

(52) U.S. Cl.
CPC ............ *G06F 21/572* (2013.01); *G06F 21/31* (2013.01); *G06F 21/575* (2013.01); *G06F 21/74* (2013.01)

(58) Field of Classification Search
CPC ...... G06F 21/572; G06F 21/31; G06F 21/575; G06F 21/74
See application file for complete search history.

(56) References Cited

U.S. PATENT DOCUMENTS

| | | | |
|---|---|---|---|
| 5,802,592 A * | 9/1998 | Chess ................... | G06F 9/4401 711/102 |
| 8,332,931 B1 | 12/2012 | Tran et al. | |
| 8,429,643 B2 | 4/2013 | Venkatachalam et al. | |
| 8,607,216 B2 | 12/2013 | Ibrahim et al. | |

(Continued)

FOREIGN PATENT DOCUMENTS

| | | |
|---|---|---|
| EP | 3543892 | 9/2019 |
| KR | 10-0818237 | 3/2008 |

OTHER PUBLICATIONS

European Search Report dated Feb. 1, 2021 in corresponding European Patent Application No. 20193670.5 (7 pages).

*Primary Examiner* — Gary Collins
(74) *Attorney, Agent, or Firm* — F. Chau & Associates, LLC (57) ABSTRACT

The present disclosure relates to an electronic device, such as a system on chip, that may perform firmware updates based on user consent. The system on chip includes a nonvolatile memory (NVM), a main processor, a security NVM, and a security processor. The nonvolatile memory (NVM) stores first firmware and a user permission indicator. The main processor Loads the first firmware to boot a security processor. The security NVM contains first version information. The security processor compares version information of the first firmware to the first version information based on the user permission indicator and executes the first firmware in response to the matching of the comparison result. In some examples, the security processor is implemented on the same chip as the main processor.

20 Claims, 8 Drawing Sheets

(56) References Cited

U.S. PATENT DOCUMENTS

| | | | |
|---|---|---|---|
| 9,864,599 B2 | 1/2018 | Lu et al. | |
| 2005/0216753 A1* | 9/2005 | Dailey | G06F 21/6209 |
| | | | 713/191 |
| 2009/0271533 A1* | 10/2009 | Asnaashari | G06F 8/654 |
| | | | 710/13 |
| 2010/0185845 A1* | 7/2010 | Takayama | G06F 21/575 |
| | | | 713/2 |
| 2011/0131403 A1* | 6/2011 | Ibrahim | G06F 21/572 |
| | | | 713/2 |
| 2013/0179870 A1* | 7/2013 | Kelso | G06F 8/65 |
| | | | 717/169 |
| 2015/0199518 A1 | 7/2015 | Tokumoto | |
| 2015/0220319 A1 | 8/2015 | Weiss et al. | |
| 2016/0162281 A1* | 6/2016 | Hokiyama | G06F 8/65 |
| | | | 717/173 |
| 2016/0196130 A1* | 7/2016 | Shimizu | G06F 8/65 |
| | | | 717/168 |
| 2016/0330175 A1 | 11/2016 | Li et al. | |
| 2018/0089435 A1* | 3/2018 | Zander | G06F 21/575 |
| 2019/0042229 A1* | 2/2019 | Kotary | G06F 8/66 |
| 2019/0042725 A1 | 2/2019 | Ruan et al. | |
| 2020/0057629 A1* | 2/2020 | Samuel | G06F 8/654 |
| 2020/0073652 A1* | 3/2020 | Chen | G06F 8/65 |
| 2020/0184066 A1* | 6/2020 | Shin | G06F 9/4403 |

\* cited by examiner

ELECTRONIC DEVICE FOR UPDATING FIRMWARE BASED ON USER AUTHENTICATION AND AN OPERATING METHOD THEREOF

CROSS-REFERENCE TO RELATED APPLICATION

This application claims the benefit of Korean Patent Application No. 10-2020-0004950, filed on Jan. 14, 2020, in the Korean Intellectual Property Office, the disclosure of which is incorporated by reference herein in its entirety.

BACKGROUND

Mobile devices such as tablet computers, mobile phones, and laptops utilize software to perform various functions related to usability of the device. The term software may include data stored temporarily in user controlled memory, and firmware stored semi-permanently in hardware memory.

In some cases, firmware must be updated to provide the latest operation system requirements. For example, manufacturer-based updates may provide up-to-date firmware to a mobile device. The manufacturer-based updates provide application optimization, increased device speeds, new features, operating system stability, and the like.

Among other updating methods, over-the-air (OTA) updating is a preferred method of mobile device updates. These updates may be automatically loaded on to mobile devices and executed by the device manufacturer, regardless of user preferences. In some cases, there is no way to reject a new firmware update. This can create problems when, for example, the update includes a security vulnerability.

Thus, automatic updates may create a security risk for mobile devices. If the updates are performed regardless of user preference, the user may have little or no way to avoid the risk. Therefore, there is a need in the art for systems and methods that provide users more control over firmware updates.

SUMMARY

The inventive concept provides an electronic device for updating firmware based on whether a user is authenticated when new firmware update is detected and an operating method thereof.

According to an aspect of the inventive concept, there is provided an electronic device including: a nonvolatile memory (NVM) storing first firmware and a user permission indicator; a main processor configured to load the first firmware to boot a security processor; a security NVM containing first version information; and the security processor configured to compare version information of the first firmware with the first version information based on the user authentication indicator and execute the first firmware in response to matching of the comparison result.

According to another aspect of the inventive concept, there is provided an operating method of an electronic device, the operating method including: booting a security processor according to first firmware; comparing version information of the first firmware with first version information based on a user permission indicator; and executing the first firmware when the comparison result is a match.

According to another aspect of the inventive concept, there is provided an electronic device including: a nonvolatile memory (NVM) storing first firmware, second firmware, and an update indicator indicating that the second firmware is stored; a main processor configured to load the first firmware when the update indicator is inactivated, and load the second firmware when the update indicator is activated; and a security processor configured to verify a digital signature for the first firmware when the first firmware is loaded and execute the first firmware in response to the success of the verification or to verify a digital signature for the second firmware when the second firmware is loaded and execute the second firmware in response to the success of the verification.

According to another aspect of the inventive concept, a method of updating firmware, the method may include receiving a firmware update for a firmware of the electronic device; identifying a user permission indicator indicating that user consent is required prior to updating the firmware; obtaining consent to update the firmware based on the user permission indicator; and updating the firmware with the firmware update based on the consent.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present disclosure relates to electronic devices, and more particularly, to an electronic device that enables a user to determine whether to perform firmware update. For example, embodiments of the present disclosure determine whether to perform updates based on user permissions.

Accordingly, embodiments of the present provide users the ability to determine whether their mobile device performs an update based on user consent. When consent-based update is activated, version information of firmware running at a corresponding time point may be stored in a security memory. When system booting is performed, the system may verify whether the firmware contains the same version of the firmware as that which the user has agreed to.

In some embodiments, when a firmware updated is presented, system booting is performed according to existing firmware. User authentication is then performed to determine whether the user is an authorized user. Version information of the updated firmware, which may be running when the user authentication is performed, is stored in the security memory. When rebooting is performed, the updated firmware is loaded, and it is determined whether the version information of the loaded firmware matches the pre-stored version information. Then, booting is performed using new firmware. The existing firmware may be replaced by the new firmware after the booting using the new firmware is completed.

As used herein, the term main firmware may indicate firmware configured to operate when an electronic device starts booting. The main firmware may be replaced by various terms such as embedded firmware, current firmware, or default firmware.

Candidate firmware may indicate firmware distributed by a manufacturer of an electronic device. The candidate firmware may be installed in the electronic device to replace the main firmware previously installed. In general, the candidate firmware may be distributed to the electronic device in a wireless or wired manner, In some cases, distribution in a wireless manner may be referred to as firmware over the air (FOTA). The candidate firmware may be replaced by various terms such as update firmware, new firmware, or replacing the firmware.

According to an embodiment, the electronic device includes a nonvolatile memory (NVM), a main processor, a security NVM, and a security processor. The NVM stores first firmware and a user permission indicator. The main processor loads the first firmware to boot a security processor. The security NVM contains first version information. The security processor compares version information of the first firmware to the first version information based on the user permission indicator and executes the first firmware in response to the matching of the comparison result, wherein the security processor is implemented on the same chip as the main processor.

Hereinafter, various embodiments of the inventive concept will be described in detail with reference to the accompanying drawings.

Figure 1:
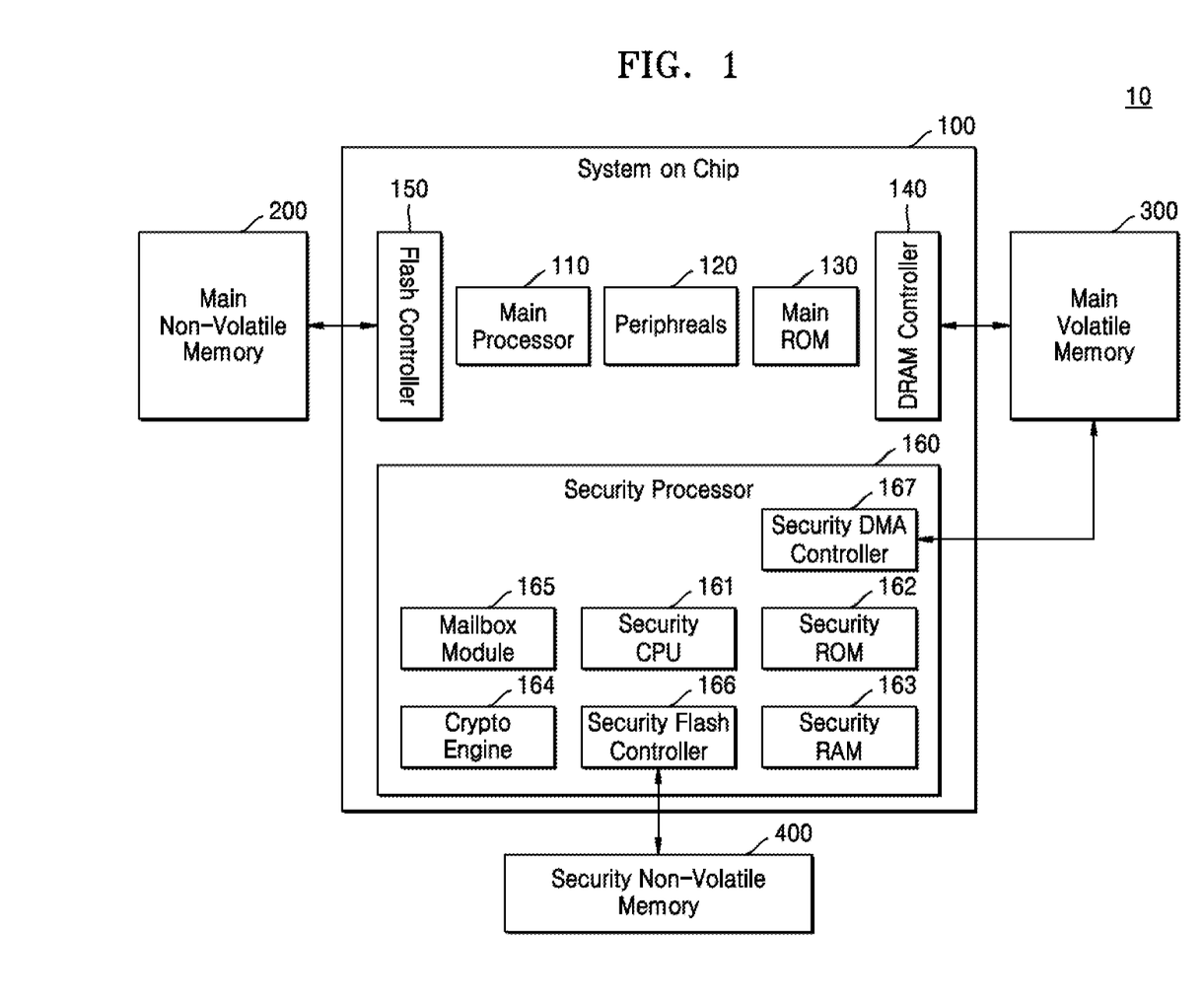
FIG. 1 is a block diagram of an electronic device according to an example embodiment of the inventive concept.

FIG. 1 is a block diagram of the electronic device 10 according to an example embodiment of the inventive concept.

Referring to FIG. 1, the electronic device 10 may include a system on chip (SoC) 100, a main NVM 200, a main volatile memory 300, and a security NVM 400.

According to various embodiments of the inventive concept, the SoC 100 may include a main processor 110, peripherals 120, main read-only memory (ROM) 130, a dynamic random access memory (DRAM) controller 140, a flash controller 150, and a security processor 160.

The main processor 110 may process general jobs of the SoC 100. For example, the main processor 110 may perform booting by loading a boot loader (301 of FIG. 3) on the main volatile memory 300 in response to powering-on of the electronic device 10 and control an operation of a host application (303 of FIG. 3). The main ROM 130 may store various types of control information used to execute the host application 303 or operate the SoC 100. The DRAM controller 140 may manage the main volatile memory 300. For example, the DRAM controller 140 may receive firmware image data from the main NVM 200 and load the firmware image data on the main volatile memory 300. The peripherals 120 may include devices for inputs and outputs of the electronic device 10. For example, the peripherals 120 may include a display controller for controlling a display to display a pop-up window for requesting a user to input user authentication information. The flash controller 150 may write data on the main NVM 200 or read data from the main NVM 200.

The security processor 160 may include a security central processing unit (CPU) 161, security ROM 162, security RAM 163, a crypto engine 164, a mailbox module 165, a security flash controller 166, and a security direct memory access (DMA) controller 167. The security CPU 161 may perform a general operation of the security processor 160 by using the security RAM 163 and the security ROM 162. For example, the security CPU 161 may be configured to verify a digital signature for candidate firmware or check version information of the candidate firmware. The security flash controller 166 may perform data read or write with the security NVM 400. For example, when user permission is activated, the security flash controller 166 may write, on the security NVM 400, user authentication information input from the user. The user authentication information may include a user identification (ID), a password (PW), and biometric data (e.g., fingerprint information, iris information, face recognition information, voice information, or vein information) of the user. The mailbox module 165 may perform data communication between the security processor 160 and external components by using a mailbox protocol. According to an embodiment of the inventive concept, the mailbox module 165 may include a plurality of registers and perform communication by receiving a command and data from an external component and classifying the command and data.

The crypto engine 164 may encrypt input data by using a key. According to an embodiment of the inventive concept, the crypto engine 164 may encrypt user authentication information by using a security key and store the encrypted user authentication information in the security NVM 400. According to another embodiment of the inventive concept, the crypto engine 164 may provide at least one algorithm among hashed message authentication code (HMAC), Rivest, Shamir, Adleman (RSA), and elliptic curve digital signature algorithm (ECDSA) for calculating a hash value for firmware version information or verify a digital signature. The security DMA controller 167 may be electrically connected to the main volatile memory 300 outside the security processor 160. The security DMA controller 167 may access the main volatile memory 300 to read data into the security processor 160. For example, the security DMA controller 167 may read, into the security processor 160, data of firmware loaded on the main volatile memory 300.

According to various embodiments of the inventive concept, the security NVM 400 may indicate an NVM directly connected to the security processor 160 inside the SoC 100. The security NVM 400 may store data, which is to be processed by the security processor 160, and of which security is used, because the security NVM 400 performs communication with the security processor 160 inside the SoC 100. For example, the security processor 160 may store user authentication data, main image version information, candidate image version information, and the like in the security NVM 400

The user authentication data, the main image version information, and the candidate image version information may correspond to data to be used for the security processor 160 to determine whether the user of the electronic device 10 has agreed on update (or modification) to new firmware This will be described below in detail with reference to FIG. 4.

The main NVM 200 may indicate an NVM accessible to the main processor 110 and the security processor 160. For example, the main processor 110 may access the main NVM 200 to operate the boot loader 301. As another example, the security processor 160 may load data related to firmware update by accessing the main volatile memory 300 or load the data related to the firmware update by directly accessing the main NVM 200.

According to an embodiment of the inventive concept, the main NVM 200 and the security NVM 400 may include an NVM in which stored data does not vanish even when a power supply is turned off. For example, the main NVM 200 and the security NVM 400 may include a NAND flash memory, a vertical NAND flash memory, a NOR flash memory, resistive RAM, a phase-change memory, magneto-resistive RAM, or the like.

The main volatile memory 300 may be accessible to the host application 303 and the security processor 160. For example, the main volatile memory 300 may load the main firmware thereon and perform booting. According to an embodiment of the inventive concept, the main volatile memory 300 may include a memory in which stored data vanishes when a power supply is turned off. For example, the main volatile memory 300 may include static RAM (SRAM), dynamic RAM (DRAM), or magneto-resistive RAM. Hereinafter, the description will be made based on the main volatile memory 300 implemented by DRAM 300.

Figure 2:
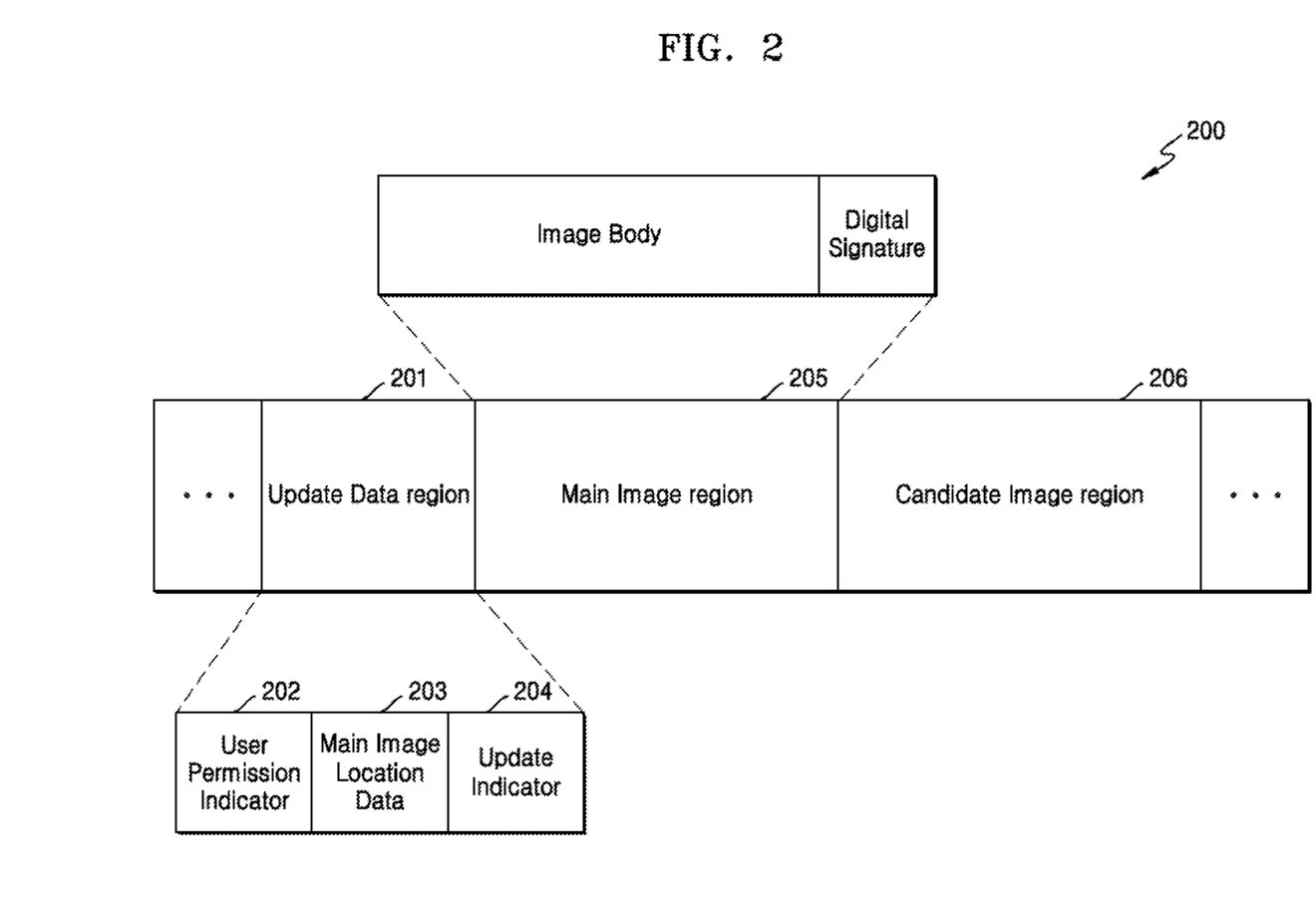
FIG. 2 is a format of data stored in a main nonvolatile memory (NVM), according to an example embodiment of the inventive concept.
Figure 3:
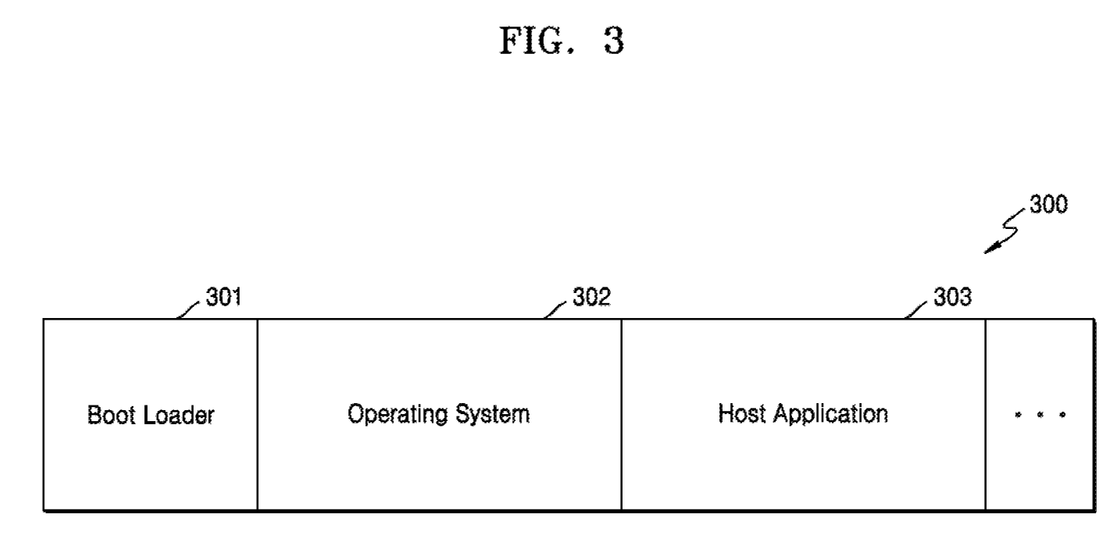
FIG. 3 is a format of data loaded on a main volatile memory, according to an example embodiment of the inventive concept.

FIG. 2 is a format of data stored in the main NVM 200, according to an example embodiment of the inventive concept. FIG. 3 is a format of data loaded on the DRAM 300, according to an example embodiment of the inventive concept. Referring to FIGS. 2 and 3, the main NVM 200 may include an update data region 201, a main image region 205, and a candidate image region 206.

The update data region 201 may include information indicating which firmware is loaded to perform booting when the boot loader 301 is activated, and the electronic device 10 starts booting. For example, the update data region 201 may include a user permission indicator 202, main image location data 203, and an update indicator 204.

According to an embodiment of the inventive concept, the user permission indicator 202 may include information indicating whether user permission is activated when booting is performed in response to the powering-on of the electronic device 10.

Herein, user permission may indicate that booting is performed through firmware installed or distributed with the user's consent. For example, when user permission is activated, even though arbitrary firmware loaded on the DRAM 300 to boot the electronic device 10 is legally distributed by the manufacturer of the electronic device 10, the booting of the electronic device 10 may fail when the loaded firmware has a version different from that of firmware installed with the user's consent.

For example, when a value of the user permission indicator 202 is "1" or logic high, the electronic device 10 may compare a version of firmware loaded on the DRAM 300 is the same as a version of firmware installed with the user's consent when booting is performed. As another example, when the value of the user permission indicator 202 is "0" or logic low, the electronic device 10 may not check a version of firmware loaded on the DRAM 300. For example, when user permission is inactivated, the electronic device 10 may perform booting according to update firmware when the update firmware is activated. A detailed description of the user permission indicator 202 will be described below with reference to FIGS. 5 to 8.

The main image location data 203 may include information related to a location where the main firmware is stored. The main image location data 203 may be implemented by a pointer or may include a start address at which an image of the main firmware and a digital signature are stored and size information of the main firmware. When the electronic device 10 performs booting, the electronic device 10 may load the main firmware on the DRAM 300 with reference to the main image location data 203.

According to an embodiment of the inventive concept, the main image location data 203 may have a value changed when a firmware update is performed. For example, the candidate firmware may be stored in a region B among the storage regions of the main NVM 200 because candidate firmware may not be overwritten in a region A in which the main firmware is stored among storage regions of the main NVM 200. Therefore, after the firmware update is completed, the main image location data 203 may have a value changed to indicate the region B.

The update indicator 204 may include information indicating whether the electronic device 10 performs firmware update. The firmware update may indicate a series of processes of changing the main firmware previously stored to newly distributed update firmware.

For example, when a value of the update indicator 204 is "1" or logic high, the update indicator 204 may indicate that firmware of a version different from that of the main firmware is stored in the candidate image region 206. Herein, the different firmware version may include the latest version and previous versions. As another example, when the value of the update indicator 204 is "0" or logic low, the update indicator 204 may indicate that firmware of a version different from that of the main firmware is not stored in the candidate image region 206. For example, the electronic device 10 may determine whether there exists newly stored update firmware, by referring to the value of the update indicator 204.

According to various embodiments of the inventive concept, the main image region 205 may correspond to a region in which data of the main firmware is stored, and the candidate image region 206 may correspond to a region in which data of candidate firmware is stored. Each firmware data may be identified by an image body and a digital signature. The digital signature may indicate information for guaranteeing that corresponding firmware was distributed by a manufacturer and has not been falsified. Referring to FIG. 3, the SoC 100 may load the boot loader 301 on the DRAM 300. The boot loader 301 may indicate a program or instructions configured to perform booting of the electronic device 10. Additionally or alternatively, the boot loader 301 may indicate a program or a set of instructions configured to wrap up some or all tasks used to correctly start a kernel by being previously executed before starting an operating system (OS) 302, and to start the OS 302.

Although FIG. 3 shows that the boot loader 301 is a single boot loader, the boot loader 301 is not limited thereto. According to various embodiments of the inventive concept, the boot loader 301 may have a hierarchical structure. For example, the boot loader 301 may include stage 1 and stage 2 and may further include stage 1.5. When the boot loader 301 has a hierarchical structure, stages therein may be sequentially executed.

The SoC 100 may load the host application 303 on the DRAM 300. The host application 303 may correspond to a program or instructions to be performed by the main processor 110. The host application 303 may operate independently to the OS 302. For example, the host application 303 may normally operate even before starting the OS 302.

Figure 4:
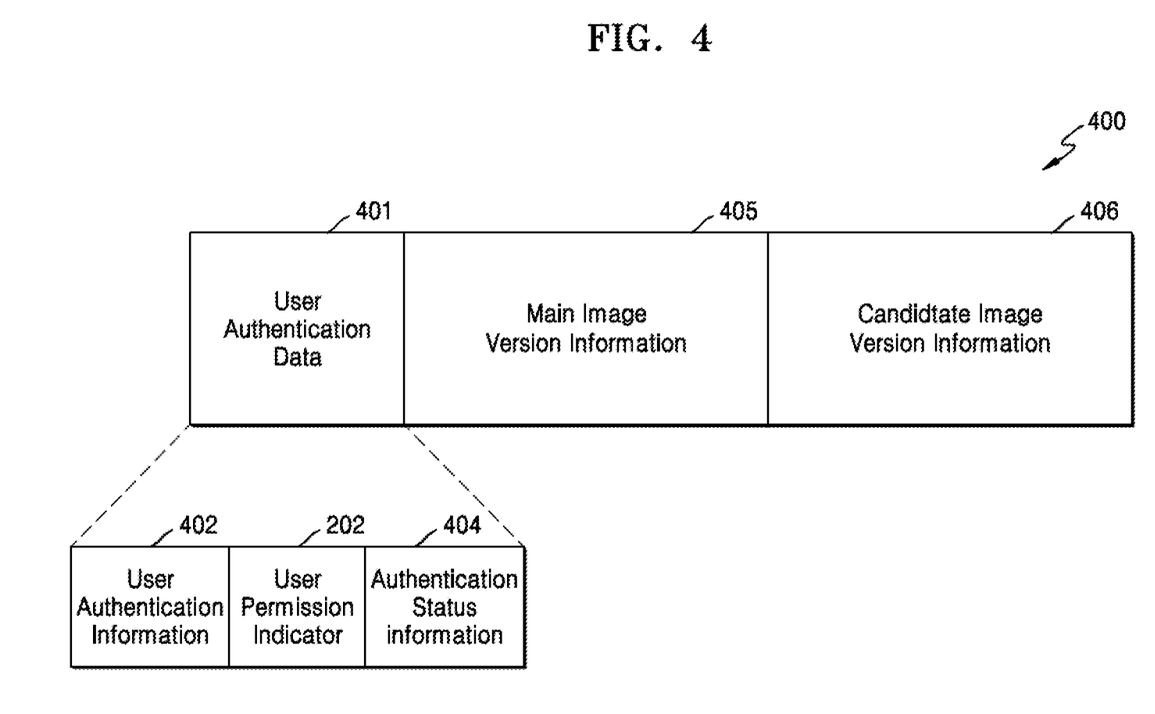
FIG. 4 is a format of data stored in a security NVM, according to an example embodiment of the inventive concept.

FIG. 4 is a format of data stored in the security NVM 400, according to an example embodiment of the inventive concept.

Referring to FIG. 4, the security NVM 400 may include user authentication data 401, main image version information 405, and candidate image version information 406.

The user authentication data 401 may include information related to user authentication. For example, the user authentication data 401 may include user authentication information 402, the user permission indicator 202, and authentication status information 404.

A description of the user permission indicator 202 included in the user authentication data 401 is made with reference to FIG. 2 and is omitted herein.

The user authentication information 402 may be generated when user authentication is initially activated, and stored in the security NVM 400. For example, the user authentication information 402 may be information input when the user of the electronic device 10 initially activates user authentication. Thereafter, the electronic device 10 may authenticate whether a user is an authorized user when a firmware update is performed. The user authentication information 402 may include a combination of random characters, numbers, symbols, and the like. Additionally or alternatively, the user authentication information 402 may also include the user's biometric data (e.g., fingerprint information, iris information, face recognition information, voice information, or vein information).

The authentication status information 404 may include information indicating a result of user authentication. When new firmware is installed after activating user permission, the electronic device 10 may control the display controller among the peripherals 120 to display, on the display, a pop-up window for requesting an input of user authentication information. For example, the user authentication information input through the pop-up window may be verified using the user authentication information 402 stored in the security NVM 400. When the verification is successful, the user is an authorized user. Therefore, the authentication status information 404 may have a value of "1" or logic high. As another example, when the verification fails, the user is not an authorized user. Therefore, the user authentication fails, and the authentication status information 404 may have a value of "0" or logic low.

The main image version information 405 may include version information of the main firmware. The version information is not limited to information indicated by a firmware version officially named by a manufacturer and may include various types of information that may certify the main firmware.

For example, the main image version information 405 may include a hash value of the main firmware. Because the hash value may vary due to a very minute data difference between the main firmware and random firmware, the hash value may certify the main firmware. As another example, the main image version information 405 may include a value of a digital signature for the main firmware. The digital signature may be generated based on at least one algorithm among HMAC, RSA, and ECDSA. However, the main image version information 405 is not limited to a hash value or a digital signature value and may include some or all values which may certify firmware.

The candidate image version information 406 may include version information of candidate firmware. Like the main image version information 405, the candidate image version information 406 may include a hash value and/or a digital signature value of the candidate firmware.

According to various embodiments of the inventive concept, a size of the version information of the main firmware and/or the candidate firmware may be variable. The size of the version information may be determined based on a security level of the security processor 160. For example, when the security level of the security processor 160 is higher than a threshold level, the main image version information 405 and/or the candidate image version information 406 may include a hash value obtained by using a hash function (e.g., SHA-512) with a long digest. The digest may indicate an output of the hash function and may correspond to a length of output bits. As another example, when the security level of the security processor 160 is lower than the threshold level, the main image version information 405 and/or the candidate image version information 406 may include a hash value obtained by using a hash function (e.g., SHA-256) with a short digest.

Figure 5:
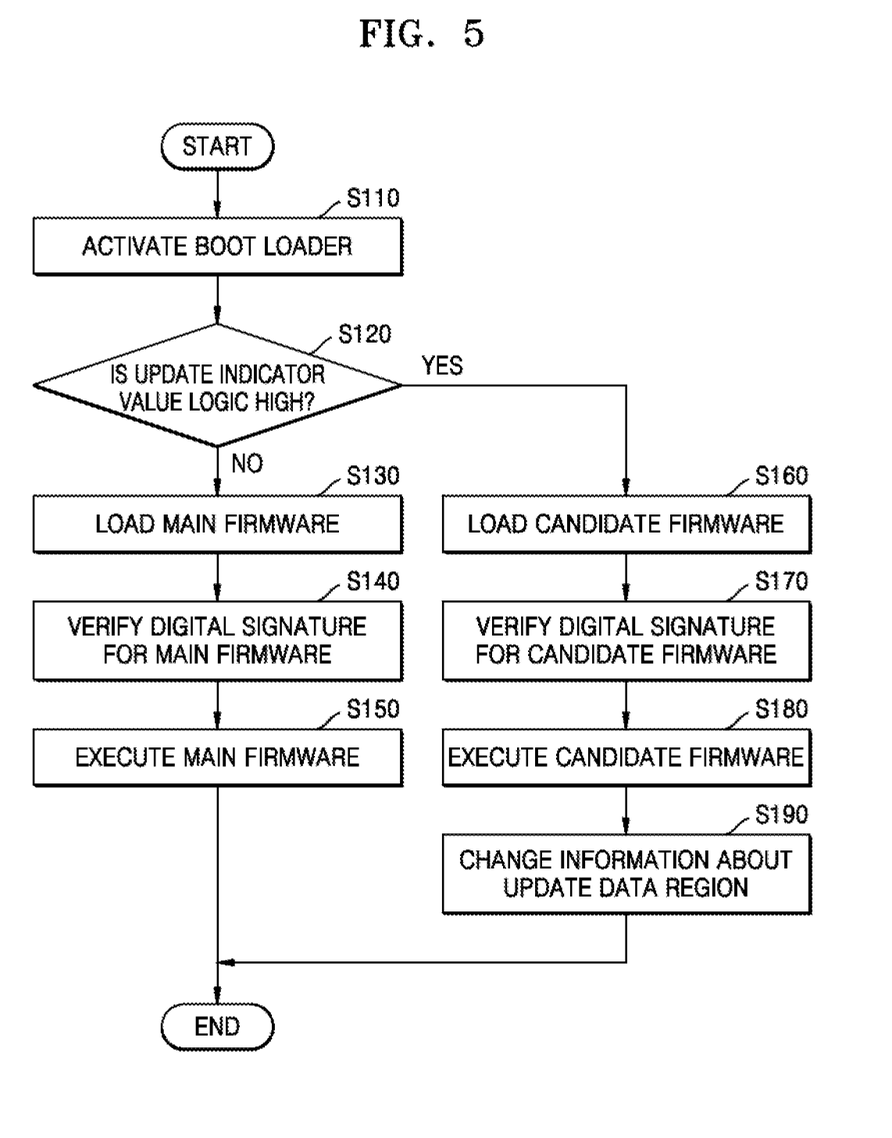
FIG. 5 is a flowchart of an operating sequence of an electronic device when user permission is inactivated, according to an example embodiment of the inventive concept.

FIG. 5 is a flowchart of an operating sequence of the electronic device 10 when user permission is inactivated, according to an example embodiment of the inventive concept.

Referring to FIG. 5, the electronic device 10 may activate the boot loader 301 in operation S110. In response to powering-on the electronic device 10, the boot loader 301 may be loaded on the DRAM 300 to perform a boot sequence, and the host application 303 may be driven.

In operation S120, the electronic device 10 may determine whether an update indicator value has a certain logic value (e.g., a "1", or logic high value). For example, the update indicator 204 may indicate whether candidate firmware is newly stored. The host application 303 of the electronic device 10 may identify the update indicator value by loading the update data region 201 stored in the main NVM 200.

In operation S130, the electronic device 10 may load the main firmware on the DRAM 300. When the update indicator value is "0" or logic low in operation S120, candidate firmware for a firmware update other than the main firmware does not exist. Therefore, the main firmware is loaded to boot the main firmware previously installed.

According to various embodiments of the inventive concept, data, when operation S130 is performed, is as follows.

TABLE 1

| Update data region (main NVM) | |
|---|---|
| User permission indicator | "0" or logic low |
| Main image location data | Region A |
| Update indicator | "0" or logic low |
| Image version information (security NVM) | |
| Main image version information | Null |
| Candidate image version information | Null |
| User authentication data (security NVM) | |
| User ID | Null |
| User password | Null |
| User permission indicator | "0" or logic low |
| Authentication status information | Don't Care |

In operation S140, the electronic device 10 may verify a digital signature for the main firmware. The digital signature may be used to verify whether firmware was distributed by an authorized issuer (e.g., the manufacturer of the electronic device 10) and has not been falsified) The security processor 160 booted in operation S130 may perform signature verification based on the digital signature included in the main firmware.

In operation S150, the electronic device 10 may execute the main firmware. After verifying the digital signature, the security processor 160 may execute the main firmware. When user permission is activated, version information of firmware to be executed is supposed to be checked, but user permission has not been activated. Therefore, a process of checking version information of firmware may be skipped or bypassed.

In operation S160, the electronic device 10 may load candidate firmware on the DRAM 300. When the update indicator value is "1" or logic high in operation S120, the host application 303 may identify that candidate firmware for a firmware update exists to replace the main firmware. Therefore, the host application 303 may load the candidate firmware to boot the candidate firmware instead of the main firmware.

According to various embodiments of the inventive concept, data when operation S160 is performed is as follows.

TABLE 2

| Update data region (main NVM) | |
| --- | --- |
| User permission indicator | "0" or logic low |
| Main image location data | Region A |
| Update indicator | "1" or logic high |
| Image version information (security NVM) | |
| Main image version information | Null |
| Candidate image version information | Null |
| User authentication data (security NVM) | |
| User ID | Null |
| User password | Null |
| User permission indicator | "0" or logic low |
| Authentication status information | Don't Care |

In operation S170, the electronic device 10 may verify a digital signature of the candidate firmware. A description of verification of the digital signature is the same as the description of operation S140 and is omitted herein.

In operation S180, the electronic device 10 may execute the candidate firmware. After verifying the digital signature, the security processor 160 may execute the candidate firmware. When user permission is activated, version information of the candidate firmware to be executed will be checked. However, if user permission has not been activated, the process of checking version information of firmware may be skipped.

In operation S190, electronic device 10 may change the information in the update data region 201. For example, when the candidate firmware is distributed (or received) in a state where the main firmware is stored in the region A of the main NVM 200, the candidate firmware may be stored in the region B of the main NVM 200. Because booting using the candidate firmware has succeeded in operation S180, the host application 303 of the electronic device 10 may change the main image location data 203 from the region A to the region B so that the candidate firmware is booted when booting is performed thereafter. For example, when the booting using the candidate firmware is finished, information may be changed to identify the candidate firmware as the main firmware. Additionally or alternatively, the host application 303 may delete the existing main firmware stored in the region A and change the value of the update indicator 204 to "0" or logic low because new candidate firmware is not stored in the region A yet. When the value of the update indicator 204 is not changed, a wrong operation may occur by considering that new firmware update is performed when booting is performed.

In some cases, the main firmware stored in the region A is deleted and the host application 303 changes the value of the update indicator 204 to "0" or logic low in response to the deletion of the main firmware. However, the present embodiment is not limited thereto. When the host application 303 changes the value of the update indicator 204 to "0" or logic low and changes the main image location data 203 from the region A to the region B, the host application 303 may bypass the deletion of the main firmware stored in the region A. Because the update indicator value and the main image location data 203 have been changed, the host application 303 does not perform booting by using the existing main firmware stored in the region A. When new firmware is received, the host application 303 may overwrite the existing main firmware stored in the region A.

According to various embodiments of the inventive concept, data, when operation S190 is performed, is as follows.

TABLE 3

| Update data region (main NVM) | |
| --- | --- |
| User permission indicator | "0" or logic low |
| Main image location data | Region B |
| Update indicator | "0" or logic low |
| Image version information (security NVM) | |
| Main image version information | Null |
| Candidate image version information | Null |
| User authentication data (security NVM) | |
| User ID | Null |
| User password | Null |
| User permission indicator | "0" or logic low |
| Authentication status information | Don't Care |

Figure 6:
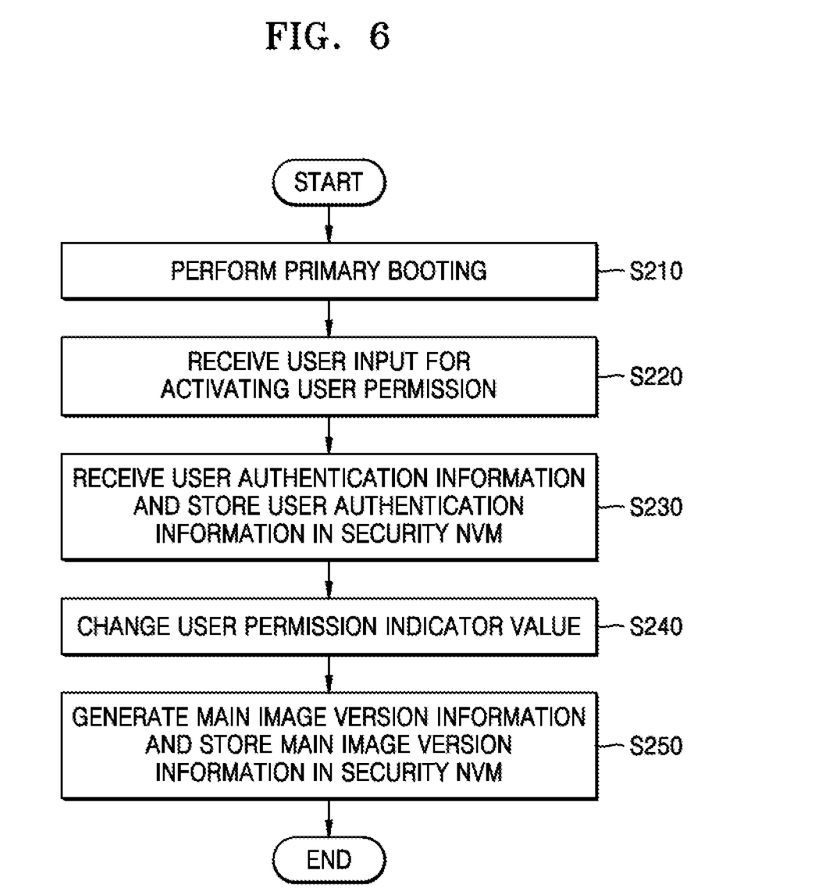
FIG. 6 is a flowchart of an operating sequence of an electronic device for activating user permission, according to an example embodiment of the inventive concept.

FIG. 6 is a flowchart of an operating sequence of the electronic device 10 for activating user permission, according to an example embodiment of the inventive concept.

Referring to FIG. 6, in operation S210, the electronic device 10 may perform primary booting. Herein, the primary booting may indicate booting before user permission is activated. For example, the primary booting may indicate that the user initially booted the electronic device 10 shipped from the manufacturer. Therefore, completion of the primary booting may indicate that the operations of FIG. 5 are performed. For example, in operation S210, user permission is inactivated, and the main firmware may be firmware (factory initialization firmware) when the electronics device 10 was manufactured or one of the pieces of firmware additionally distributed by the manufacturer after the electronics device 10 was manufactured.

According to various embodiments of the inventive concept, data, when operation S210 is performed, is as follows.

TABLE 4

| Update data region (main NVM) | |
| --- | --- |
| User permission indicator | "0" or logic low |
| Main image location data | Region A |
| Update indicator | "0" or logic low |

TABLE 4-continued

| Image version information (security NVM) | |
| --- | --- |
| Main image version information | Null |
| Candidate image version information | Null |
| User authentication data (security NVM) | |
| User ID | Null |
| User password | Null |
| User permission indicator | "0" or logic low |
| Authentication status information | Don't Care |

In operation S220, the electronic device 10 may receive a user input for activating user permission. For example, the electronic device 10 may display on the display, among the peripherals 120, a pop-up window including a visual notification such as "Do you want to suspend automatic firmware update?" or "Do you want to perform firmware update with a user's consent?" when a firmware update is performed. Alternatively, the user may directly input the activation of user permission by entering a menu through which user permission is activated.

In operation S230, electronic device 10 may receive user authentication information and store the user authentication information in the security NVM 400. The user authentication information may be information about the user ID and the user password described above with reference to FIG. 4.

In some cases, the host application 303 of the electronic device 10 may display a pop-up window for requesting input of user authentication information to activate user permission. For example, the pop-up window may display regions for inputting the user ID and PW or display guide information for obtaining biometric information. The host application 303 may transmit the input user authentication information to the security processor 160. By transmitting the user authentication information to the security processor 160 and storing the same in the security NVM 400, a firmware update to be performed by the security processor 160 may be performed not based on unreliable user authentication information stored in the outside of the electronic device 10 but based on the user authentication information stored in the security NVM 400 which is connected with the security processor 160. Accordingly, the security and reliability of firmware update performed by the security processor 160 may be increased.

In operation S240, the electronic device 10 may change a value of the user permission indicator 202. For example, because the value of the user permission indicator 202 is "0" or logic low before the user activates user permission, the value of the user permission indicator 202 may be changed to "1" or logic high. By changing the value of the user permission indicator 202, when a firmware update is performed thereafter, the host application 303 of the electronic device 10 may perform a user permission operation.

In operation S250, the electronic device 10 may generate version information of the main firmware and store the version information in the security NVM 400. Before user permission is activated, the firmware of a version permitted by the user is booted may or may not be checked. Therefore, version information of the main firmware may not be generated or stored. However, firmware may be checked whether to be booted corresponding to firmware permitted by the user when user permission is activated. Therefore, the version information of the main firmware, i.e., firmware loaded when user permission is activated, may be generated and stored. The version information of the main firmware may correspond to the main image version information 405 of FIG. 4

Particularly, the security processor 160 may generate the main image version information 405 and store the main image version information 405 in the security NVM 400. Accordingly, information for determining whether firmware has a version permitted by the user may be used as the main image version information 405 stored not in the outside of the electronic device 10 but in the security NVM 400, which may be connected with the security processor 160. Accordingly, the security and reliability of a booting process performed by the security processor 160 may be increased.

According to various embodiments of the inventive concept, data, when user permission is activated in FIG. 6, is as follows.

TABLE 5

| Update data region (main NVM) | |
| --- | --- |
| User permission indicator | "1" or logic high |
| Main image location data | Region A |
| Update indicator | "0" or logic low |
| Image version information (security NVM) | |
| Main image version information | 0x9700 . . . |
| Candidate image version information | Null |
| User authentication data (security NVM) | |
| User ID | uasr1 . . . |
| User password | q1w2e3 |
| User permission indicator | "1" or logic high |
| Authentication status information | Not padded |

Figure 7:
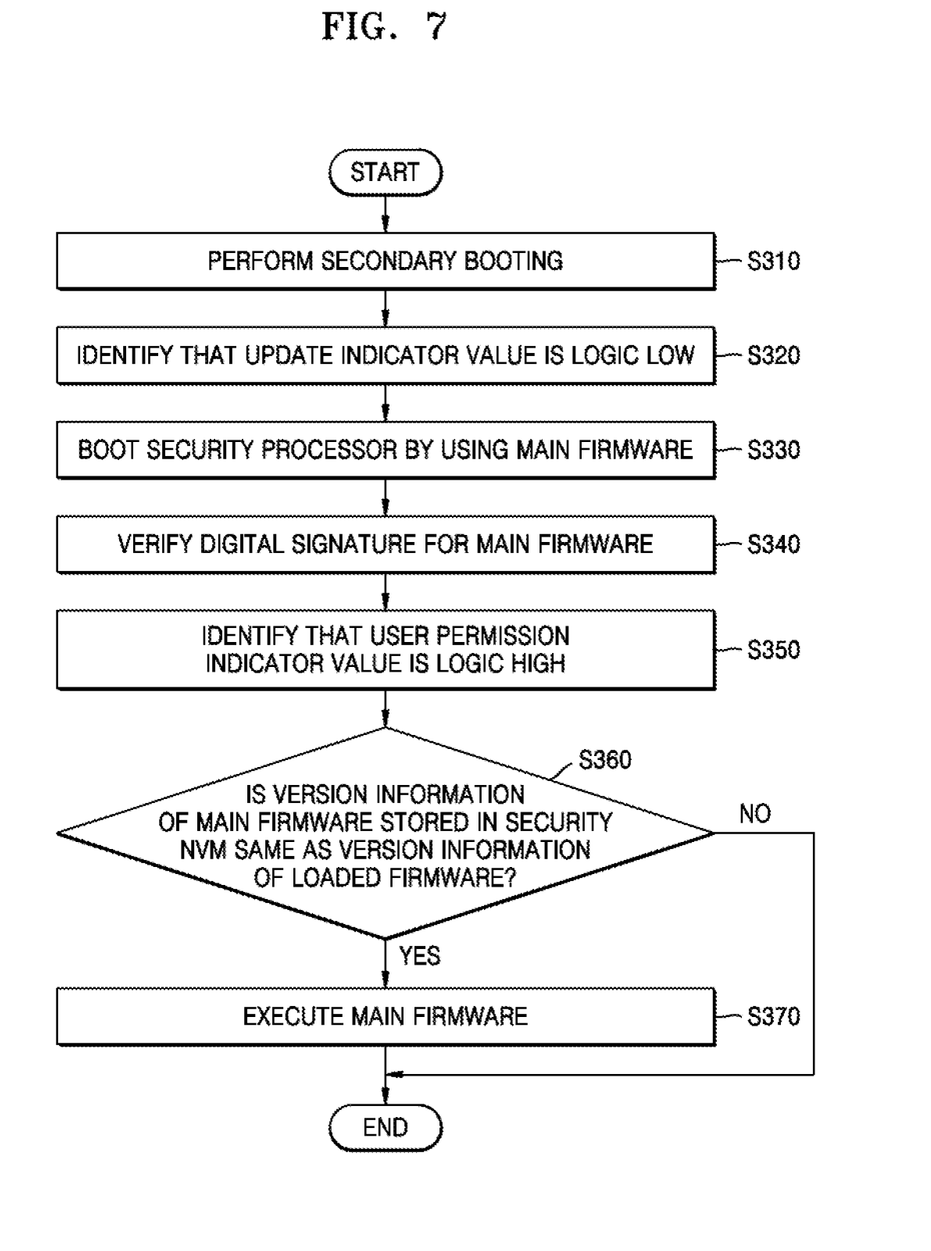
FIG. 7 is a flowchart of an operating sequence of an electronic device for performing booting by using main firmware when user permission is activated, according to an example embodiment of the inventive concept.

FIG. 7 is a flowchart of an operating sequence of the electronic device 10 for performing booting by using the main firmware when user permission is activated, according to an example embodiment of the inventive concept.

Referring to FIG. 7, in operation S310, the electronic device 10 may perform secondary booting. Herein, the secondary booting may indicate booting after user permission is activated in FIG. 6.

According to various embodiments of the inventive concept, data, when the secondary booting of operation S310 is performed, is as follows.

TABLE 6

| Update data region (main NVM) | |
| --- | --- |
| User permission indicator | "1" or logic high |
| Main image location data | Region A |
| Update indicator | "0" or logic low |
| Image version information (security NVM) | |
| Main image version information | 0x9700 . . . |
| Candidate image version information | Null |
| User authentication data (security NVM) | |
| User ID | uasr1 . . . |
| User password | q1w2e3 . . . |
| User permission indicator | "1" or logic high |
| Authentication status information | Not passed |

In operation S320, the electronic device 10 may identify that an update indicator value is logic low. The host application 303 of the electronic device 10 may load the update data region 201 stored in the main NVM 200, identify that a value of the update indicator 204 is "0" or logic low, and determine that there does not exist candidate firmware for performing a firmware update. The host application 303 may identify that user permission is activated, based on the user permission indicator 202 stored in the main NVM 200, but the firmware update may not be performed. Therefore, the host application 303 may perform booting by loading the main firmware on the DRAM 300.

In operation S330, the electronic device 10 may boot the security processor 160 by using the main firmware. A description of operation S330 is the same as the description of operation S130 of FIG. 5 and is omitted herein.

In operation S340, the electronic device 10 may verify a digital signature for the main firmware. A description of operation S340 is the same as the description of operation S140 of FIG. 5 and is omitted herein.

In operation S350, the electronic device 10 may identify that a value of the user permission indicator 202 is logic high. The security processor 160 of the electronic device 10 may determine that user permission is activated, based on a value of the user permission indicator 202 stored in the security NVM 400. When user permission is activated, the digital signature for the main firmware may be determined as verified and whether firmware loaded on the security RAM 163 matches firmware of a version permitted by the user.

In operation S360, the electronic device 10 may compare whether the main image version information 405 stored in the security NVM 400 is the same as version information of the loaded firmware. For example, the security processor 160 may generate test version information of the firmware loaded on the security RAM 163 to determine whether the loaded firmware is the same as the firmware of the version permitted by the user. The test version information may be generated by performing a calculation on the firmware loaded on the security RAM 163 based on the same function as a function used to generate the main image version information 405. For example, when the main image version information 405 is generated based on SHA-512 among hash functions, the security processor 160 may perform a calculation on the firmware loaded on the security RAM 163 by using a hash function, SHA-512.

When the two pieces of version information differ from each other, the firmware currently loaded on the security RAM 163 is not firmware of the version permitted by the user. Therefore, booting may fail and an operating sequence may end.

In operation S370, the electronic device 10 may execute the main firmware. When the two pieces of version information match in operation S360, the main firmware currently loaded on the security RAM 163 is the firmware of the version permitted by the user. Therefore, the security processor 160 may complete booting by executing the main firmware.

Figure 8:
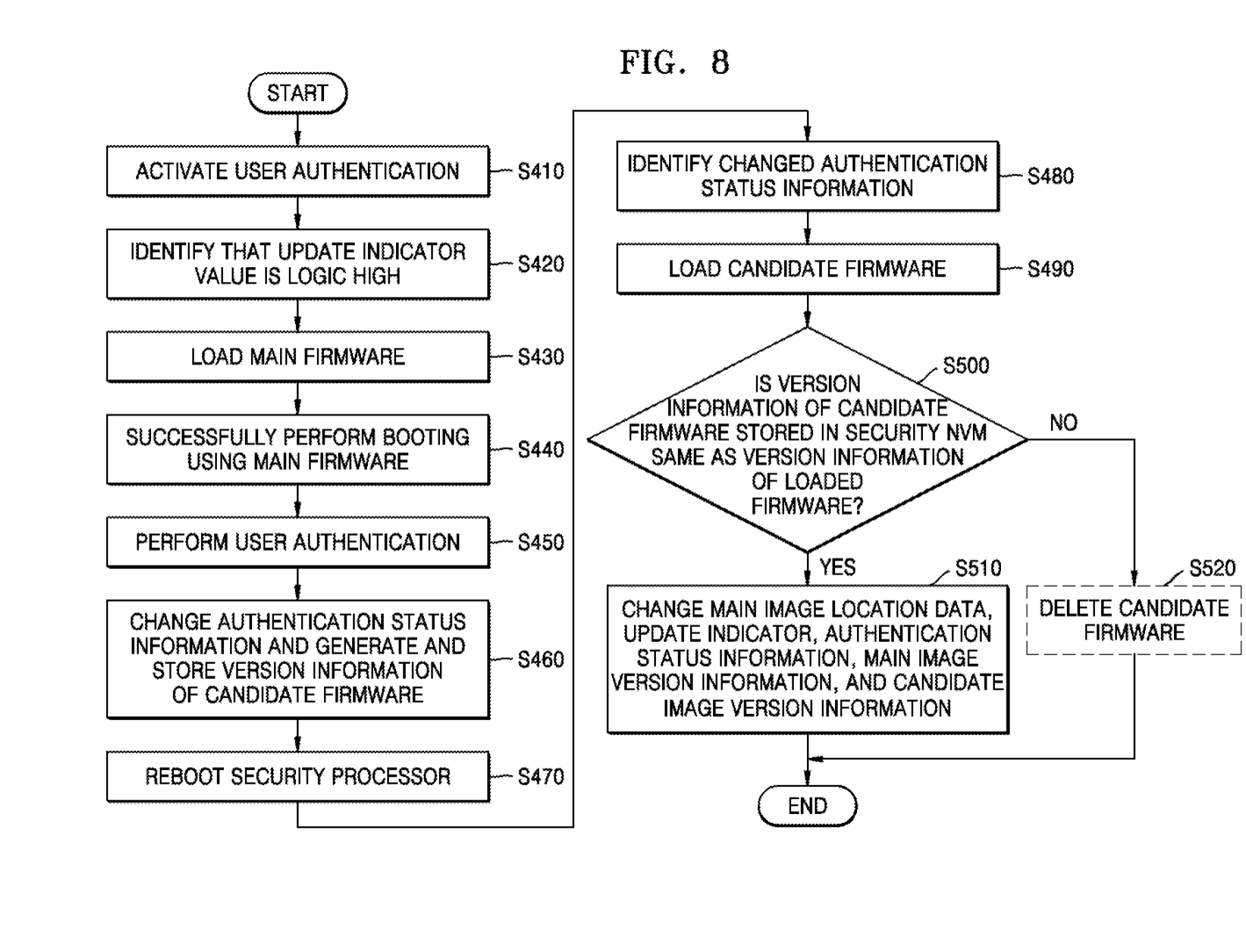
FIG. 8 is a flowchart of an operating sequence of an electronic device for performing firmware update by using candidate firmware when user permission is activated, according to an example embodiment of the inventive concept.

FIG. 8 is a flowchart of an operating sequence of the electronic device 10 for performing a firmware update by using candidate firmware when user permission is activated, according to an example embodiment of the inventive concept.

Referring to FIG. 8, in operation S410, the electronic device 10 may activate user permission. A process of activating user permission may indicate that operations S210 to S250 of FIG. 6 are completed.

In operation S420, the electronic device 10 may identify that an update indicator value is logic high. For example, the electronic device 10 may receive candidate firmware distributed from the manufacturer and store the received candidate firmware in the main NVM 200. When the candidate firmware is received, the host application 303 of the electronic device 10 changes the update indicator 204 to "1" or logic high. Therefore, the host application 303 may identify that a firmware update is supposed to be performed based on a value of the update indicator 204 in a booting process.

According to various embodiments of the inventive concept, data, when operation S420 is performed, is as follows.

TABLE 7

| Update data region (main NVM) | |
|---|---|
| User permission indicator | "1" or logic high |
| Main image location data | Region A |
| Update indicator | "1" or logic high |
| Image version information (security NVM) | |
| Main image version information | 0x9700 . . . |
| Candidate image version information | Null |
| User authentication data (security NVM) | |
| User ID | uasr1 . . . |
| User password | q1w2e3 . . . |
| User permission indicator | "1" or logic high |
| Authentication status information | Not passed |

In operation S430, the electronic device 10 may boot the security processor 160 by using the main firmware. When the value of the update indicator 204 is identified as logic high, booting is performed using the main firmware to obtain the user's consent on a firmware update. For example, when the value of the update indicator 204 is identified, the authentication status information 404 may be "0" or FAIL. Therefore, the host application 303 may boot the security processor 160 by using the existing main firmware.

In operation S440, the electronic device 10 may successfully perform booting by using the main firmware. Herein, the successful booting of operation S440 may be the same as performing operations S340 to S370 of FIG. 7. For example, because user permission is activated, it would be understood by those of ordinary skill in the art that the main firmware may be executed through a process of verifying a digital signature for the main firmware and checking whether the main firmware is the same as the firmware of the version permitted by the user.

In operation S450, the electronic device 10 may perform user authentication. The electronic device 10 may display, on the display among the peripherals 120, a pop-up window for requesting the user to input a user ID and a user password. Alternatively, the electronic device 10 may display a pop-up window for guiding an input of biometric data.

The host application 303 may transmit the input user authentication information to the security processor 160. The security processor 160 may verify whether the user authentication information received from the host application 303 is authentication information of an authorized user by using the user authentication data 401 pre-stored in the security NVM 400. When the user authentication information received from the host application 303 is verified, the user is an authorized user. Therefore, user authentication may succeed. According to various embodiments of the inventive concept, when the verification fails, the authentication status information 404 may not be changed.

In operation S460, the electronic device 10 may change the value of the authentication status information 404 and generate and store version information of the candidate firmware. When the user authentication succeeds, the security processor 160 may change the authentication status information 404 to "1" or PASS to reflect the user authentication success.

Next, the security processor 160 may generate the version information of the candidate firmware. The version information of the candidate firmware may correspond to the candidate image version information 406 of FIG. 4. The security processor 160 may generate the candidate image version information 406 and store the same in the security NVM 400 to indicate that the user has agreed on firmware update with the candidate firmware when rebooting is performed.

According to various embodiments of the inventive concept, data, when operation S460 is performed, is as follows.

TABLE 8

| Update data region (main NVM) | |
|---|---|
| User permission indicator | "1" or logic high |
| Main image location data | Region A |
| Update indicator | "1" or logic high |
| Image version information (security NVM) | |
| Main image version information | 0x9700 . . . |
| Candidate image version information | 0x8249 . . . |
| User authentication data (security NVM) | |
| User ID | uasr1 . . . |
| User password | q1w2e3 . . . |
| User permission indicator | "1" or logic high |
| Authentication status information | Pass |

In operation S470, the electronic device 10 may reboot the security processor 160. Because booting is performed using the existing main firmware to obtain user permission, the security processor 160 may be rebooted to perform a firmware update with the candidate firmware.

In operation S480, the electronic device 10 may identify the changed authentication status information 404. The security processor 160 may identify the user permission indicator 202 and the authentication status information 404 while the rebooting is performed. Because user permission is activated, the user permission indicator 202 is "1" or logic high, and accordingly, the security processor 160 may refer to the authentication status information 404 to determine whether user authentication is completed. Because the authentication status information 404 has been changed according to the user authentication success in operation S460, the security processor 160 may identify that the candidate firmware of the version permitted by the user. Therefore, in operation S490, the security processor 160 may load the candidate firmware on the security RAM 163. It would be understood by those of ordinary skill in the art that verifying a digital signature after loading the candidate firmware on the security RAM 163 is omitted.

In operation S500, the electronic device 10 may determine whether the candidate image version information 406 stored in the security NVM 400 is the same as version information loaded on the DRAM 300. A detailed description of comparing the two pieces of version information is the same as the description of operation S360 and is omitted herein. The version information to be compared in operation S500 may be the version information of the candidate firmware. For example, the security processor 160 may determine whether the firmware currently loaded on the security RAM 163 is the same as the candidate firmware permitted for an update during the user authentication in operation S450.

In operation S510, the electronic device 10 may change the main image version information 405, the candidate image version information 406, the update indicator 204, the main image location data 203, and the authentication status information 404.

When the comparison result in operation S500 is identical, the security processor 160 may determine that the firmware loaded on the DRAM 300 is the same as the candidate firmware permitted by the user, and complete the booting based on the candidate firmware. Because the firmware update is completed, the electronic device 10 may change the main image version information 405, the update indicator 204, the main image location data 203, and the authentication status information 404 to prevent a wrong operation that there exists firmware update when booting is performed.

According to various embodiments of the inventive concept, the security processor 160 may change image version information because the existing candidate firmware becomes new main firmware after completing the firmware update. Because the firmware update is completed, the security processor 160 may replace the main image version information 405 with the existing candidate image version information 406 and delete the existing candidate version information 406. By overwriting the main image version information 405 with the existing candidate image version information 406, when booting is performed thereafter, the new main firmware may be authenticated as the firmware of the latest version permitted by the user.

Additionally or alternatively, the security processor 160 may change the authentication status information 404 to "0" or FAIL again. When the authentication status information 404 is not changed, firmware update not intended by the user may be performed because the authentication status information 404 is still PASS even though the user does not permit an update for new candidate firmware when firmware update occurs.

The main processor 110 may change a value of the update indicator 204. Because the firmware update is completed, the main processor 110 may change the value of the update indicator 204 to "0" or logic low again. When the value of the update indicator 204 is not changed, there may occur a wrong operation that new firmware update exists when booting is performed even though the firmware update is completed.

The main processor 110 may change the main image location data 203. Because a region in which the existing candidate firmware is stored is the region A of the main NVM 200, the main image location data 203 may be changed to indicate the region B. When the main image location data 203 is not changed, booting may be attempted using the region A in which the main firmware prior to the firmware update is stored. As a result, the booting may fail because firmware version information in the region A differs from the changed main image version information 405.

According to various embodiments of the inventive concept, data, when operation S510 is performed, is as follows.

TABLE 9

| Update data region (main NVM) | |
|---|---|
| User permission indicator | "1" or logic high |
| Main image location data | Region B |
| Update indicator | "0" or logic low |
| Image version information (security NVM) | |
| Main image version information | 0x8249 . . . |
| Candidate image version information | Null |
| User authentication data (security NVM) | |
| User ID | uasr1 . . . |
| User password | q1w2e3 . . . |

TABLE 9-continued

| User permission indicator | "1" or logic high |
| Authentication status information | Not passed |

In operation S520, the electronic device 10 may delete the candidate firmware. When the version information does not match in operation S500, the candidate firmware is not the firmware permitted by the user. Therefore, the candidate firmware may be deleted, and booting using the existing main firmware may be performed.

Therefore, According to another aspect of the inventive concept, a method of updating firmware, the method may include receiving a firmware update for a firmware of the electronic device; identifying a user permission indicator indicating that user consent is required prior to updating the firmware; obtaining consent to update the firmware based on the user permission indicator; and updating the firmware with the firmware update based on the consent.

In some cases, the method further comprises performing a user authentication; receiving user input for activating a user permission mode; and setting the user permission indicator based on the user authentication and the user input. In some cases, the method further comprises storing a candidate version of the firmware based on the firmware update; and setting an update indicator based on receiving the firmware update, wherein the consent is obtained based on the update indicator.

In some cases, the method further comprises performing a user authentication, wherein the consent is obtained based on the user authentication; and updating authentication status information based on the user authentication, wherein the firmware is updated based on the authentication status information. In some cases, updating the firmware further comprises loading candidate firmware associated with the firmware update; verifying version information of the candidate firmware; and saving the candidate firmware to a main image location based on the verification.

While the inventive concept has been particularly shown and described with reference to embodiments thereof, it will be understood that various changes in form and details may be made therein without departing from the spirit and scope of the following claims.

What is claimed is:

1. A system on chip comprising:
   a nonvolatile memory (NVM) storing first firmware and a user permission indicator that indicates whether to perform a comparison of an installed firmware version with a firmware version installed with user consent;
   a main processor configured to load the first firmware to boot a security processor; and
   a security NVM containing first version information;
   wherein the security processor is configured to compare version information of the first firmware with the first version information based on the user permission indicator to obtain a comparison result, and to execute the first firmware in response to matching of the comparison result, and
   wherein the security processor is implemented on a same chip as the main processor.

2. The system on chip of claim 1, wherein the security processor is further configured to:
   store a received user identification (ID) and a password in the security NVM in response to activation of the user permission indicator;
   generate a hash value of the first firmware running when the user permission indicator is activated; and
   store the generated hash value as the first version information.

3. The system on chip of claim 2, wherein the NVM is further configured to store second firmware different from the first firmware and an update indicator indicating storage of the second firmware.

4. The system on chip of claim 3, wherein the main processor is further configured to:
   identify activation of the update indicator;
   boot the security processor by using the first firmware;
   request a user to perform user authentication, in response to the activation of the update indicator; and
   transmit a user input received in response to the request to the security processor as user authentication information.

5. The system on chip of claim 4, wherein the security processor is further configured to:
   perform user authentication by comparing the received user input with the user authentication information; and
   when the comparison result is a match, to generate an ID of the second firmware, store the generated ID as second version information, and activate authentication status information indicating a result of the user authentication.

6. The system on chip of claim 5, wherein the security processor is further configured to:
   load the second firmware in response to the activation of the authentication status information;
   generate an ID of the loaded second firmware, compare the generated ID with the second version information; and
   execute the second firmware when the comparison result is a match.

7. The system on chip of claim 6, wherein the security processor is further configured to:
   inactivate the update indicator in response to the execution of the second firmware;
   store the ID of the second firmware as the first version information;
   delete the second version information; and
   inactivate the authentication status information.

8. The system on chip of claim 6, wherein the main processor is further configured to:
   identify that the comparison result is not a match; and
   inactivate the update indicator.

9. The system on chip of claim 1, wherein the NVM is further configured to store second firmware different from the first firmware, and an update indicator indicating storage of the second firmware; and
   the main processor is further configured to:
   identify inactivation of the user permission indicator;
   bypass a comparison between version information of the first firmware and the first version information in response to the identification; and
   boot the security processor according to the second firmware.

10. An operating method of a system on chip, the operating method comprising:
   booting a security processor according to first firmware;
   comparing version information of the first firmware with first version information based on a user permission indicator that indicates whether to perform a comparison of an installed firmware version with a firmware version installed with user consent to obtain a comparison result; and
   executing the first firmware when the comparison result is a match.

11. The operating method of claim 10, further comprising:
storing a received user identification (ID) and a password as user authentication information in response to activation of the user permission indicator,
storing second firmware different from the first firmware,
activating an update indicator indicating storage of the second firmware,
wherein the first version information corresponds to an ID of the first firmware running when the user permission indicator is activated.

12. The operating method of claim 11, further comprising:
identifying the activation of an update indicator;
booting the security processor according to the first firmware in response to the identification of the activation of the update indicator;
displaying information for requesting a user input for user authentication;
performing the user authentication by comparing a received user input with the user authentication information in response to the request;
generating an ID of second firmware and storing the generated ID as second version information when the comparison result is a match; and
activating authentication status information indicating a result of the user authentication.

13. The operating method of claim 12, further comprising:
identifying the activation of the authentication status information;
loading the second firmware in response to the identification;
generating an ID of the loaded second firmware and comparing the generated ID with the second version information, and
executing the second firmware when the comparison result is a match.

14. The operating method of claim 13, further comprising:
inactivating the update indicator;
storing the ID of the second firmware as the first version information and deleting the second version information; and
inactivating the authentication status information.

15. The operating method of claim 13, further comprising inactivating the update indicator when the comparison result is not a match.

16. The operating method of claim 10, further comprising:
storing second firmware different from the first firmware;
activating an update indicator indicating storage of the second firmware;
identifying inactivation of the user permission indicator; and
bypassing a comparison between version information of the first firmware and the first version information in response to the identification and booting the security processor according to the second firmware.

17. An electronic device comprising:
a nonvolatile memory (NVM) storing first firmware, second firmware, and an update indicator indicating that the second firmware is stored in a region different than the update indicator;
a main processor configured to load the first firmware when the update indicator is inactivated, and load the second firmware when the update indicator is activated; and
a security processor configured to verify a digital signature for the first firmware when the first firmware is loaded and execute the first firmware in response to a success of the verification of the digital signature for the first firmware or to verify a digital signature for the second firmware when the second firmware is loaded and execute the second firmware in response to a success of the verification of the digital signature for the second firmware,
wherein the security processor is implemented on the same chip as the main processor.

18. The electronic device of claim 17, wherein the main processor is further configured to:
receive a user input for activating user permission;
activate a user permission indicator in response to the reception;
store the user permission indicator in the NVM;
transmit the received user input to the security processor as user authentication information so that user authentication information is stored in a security NVM;
calculate an identification (ID) of firmware running when the user input is received;
generate the generated ID as first version information; and
transmit the first version information to the security NVM.

19. The electronic device of claim 18, wherein the main processor is further configured to load the first firmware in response to inactivation of the update indicator; and
the security processor is further configured to:
obtain an ID of the loaded first firmware based on activation of the user permission indicator;
compare the obtained ID with the first version information to obtain a comparison result; and
execute the first firmware in response to matching of the comparison result.

20. The device of claim 18, wherein the main processor is further configured to load the first firmware in response to activation of the update indicator; and
the security processor is further configured to:
receive a user input for performing user authentication;
verify the received user input based on user authentication information;
obtain an ID of the second firmware when the verification succeeds;
store the obtained ID in the security NVM as second version information;
load the second firmware;
obtain an ID of the loaded second firmware;
compare the obtained ID with the second version information to obtain a comparison result; and
execute the second firmware when the comparison result is a match.

* * * * *